United States Patent
Lott, III

(10) Patent No.: US 10,710,719 B1
(45) Date of Patent: Jul. 14, 2020

(54) DEPLOYABLE NAVIGATION BEACONS

(71) Applicant: Amazon Technologies, Inc., Seattle, WA (US)

(72) Inventor: Gus Kaderly Lott, III, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 235 days.

(21) Appl. No.: 15/960,231

(22) Filed: Apr. 23, 2018

(51) Int. Cl.
| | | |
|---|---|---|
| *B64D 1/02* | (2006.01) | |
| *G01S 1/04* | (2006.01) | |
| *G01S 5/10* | (2006.01) | |
| *G01S 1/08* | (2006.01) | |

(52) U.S. Cl.
CPC .............. *B64D 1/02* (2013.01); *G01S 1/047* (2013.01); *G01S 1/08* (2013.01); *G01S 5/10* (2013.01); *B64C 2201/145* (2013.01)

(58) Field of Classification Search
None
See application file for complete search history.

(56) References Cited

U.S. PATENT DOCUMENTS 9,738,401 B1 * 8/2017 Holt .......................... B64F 1/18
2019/0315486 A1 * 10/2019 Martin ................... H05B 47/19

FOREIGN PATENT DOCUMENTS

| KR | 20170056098 A | * | 5/2017 |
| KR | 101798996 B1 | * | 11/2017 |

* cited by examiner

*Primary Examiner* — Abdhesh K Jha
(74) *Attorney, Agent, or Firm* — Lee & Hayes, P.C.

(57) ABSTRACT

Deployable navigation beacons can be deployed from a vehicle, such as an unmanned aerial vehicle (UAV), in an event of a loss of position or orientation of the vehicle. After deployment of the navigation beacons, the vehicle may detect locations of the navigation beacon, which may define a surface that may include surface features. The vehicle may then perform control operations based on the resolved locations. For example, UAV may maneuver to land proximate to the navigation beacons after resolving locations of the navigation beacons as a continuous surface. The navigation beacons may output a visual signal (e.g., a light), a auditory signal (e.g., a sound), and/or a radio signal. In some embodiments, each navigation beacon may include a different or unique signal.

20 Claims, 9 Drawing Sheets

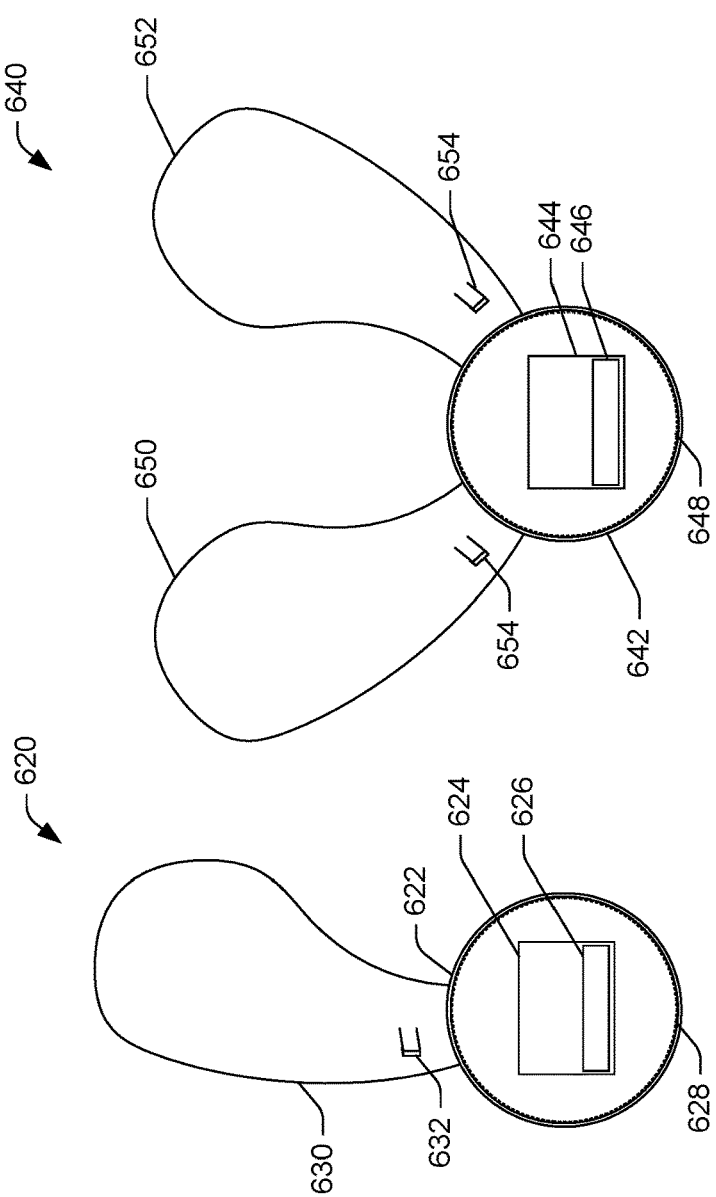

DEPLOYABLE NAVIGATION BEACONS

BACKGROUND

Unmanned aerial vehicles (UAVs) are used for a variety of tasks, spanning from recreational activities to commercial operations. Some entities have begun to use UAVs to deliver items to customers. UAVs present many benefits in consumer delivery as they are able to quickly deliver items directly to the customer at a desired customer location while avoiding may challenges faced by traditional delivery types, such as road congestion and human interaction.

In some instances, a UAV operating near the ground (e.g. for package delivery) may lose an ability to resolve its position and orientation (e.g., state estimation). Tracking position and orientation of a UAV with high temporal precision is important for stable autonomous UAV flight. There are many reasons why sensor systems might fail to track position and orientation of the UAV. For example, the UAV may be flying at night or in low light situations where light levels may not enable the camera to capture useful imagery. The vehicle may begin oscillating such that camera motion blur does not allow for useful pictures of the environment for visual navigation and inertial sensors might become saturated. Smoke or other occlusions may be present which may limit use of imagery captured by cameras. The camera or other sensors may simply stop working properly. Communication between systems and/or sensors may be severed.

To successfully execute a flight and delivery, a UAV may be equipped with redundant systems to enable successful outcomes in the event of a malfunction of equipment, such as a malfunction of a sensor or loss of reliable data from a sensor. Having an active backup system which rapidly instruments the environment with purpose built navigation queues may protect a UAV in the event of a failure of a sensor and/or disruption of useful sensor data.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 6A-6D show front elevation views of illustrative navigation beacons.

DETAILED DESCRIPTION

Figure 1:
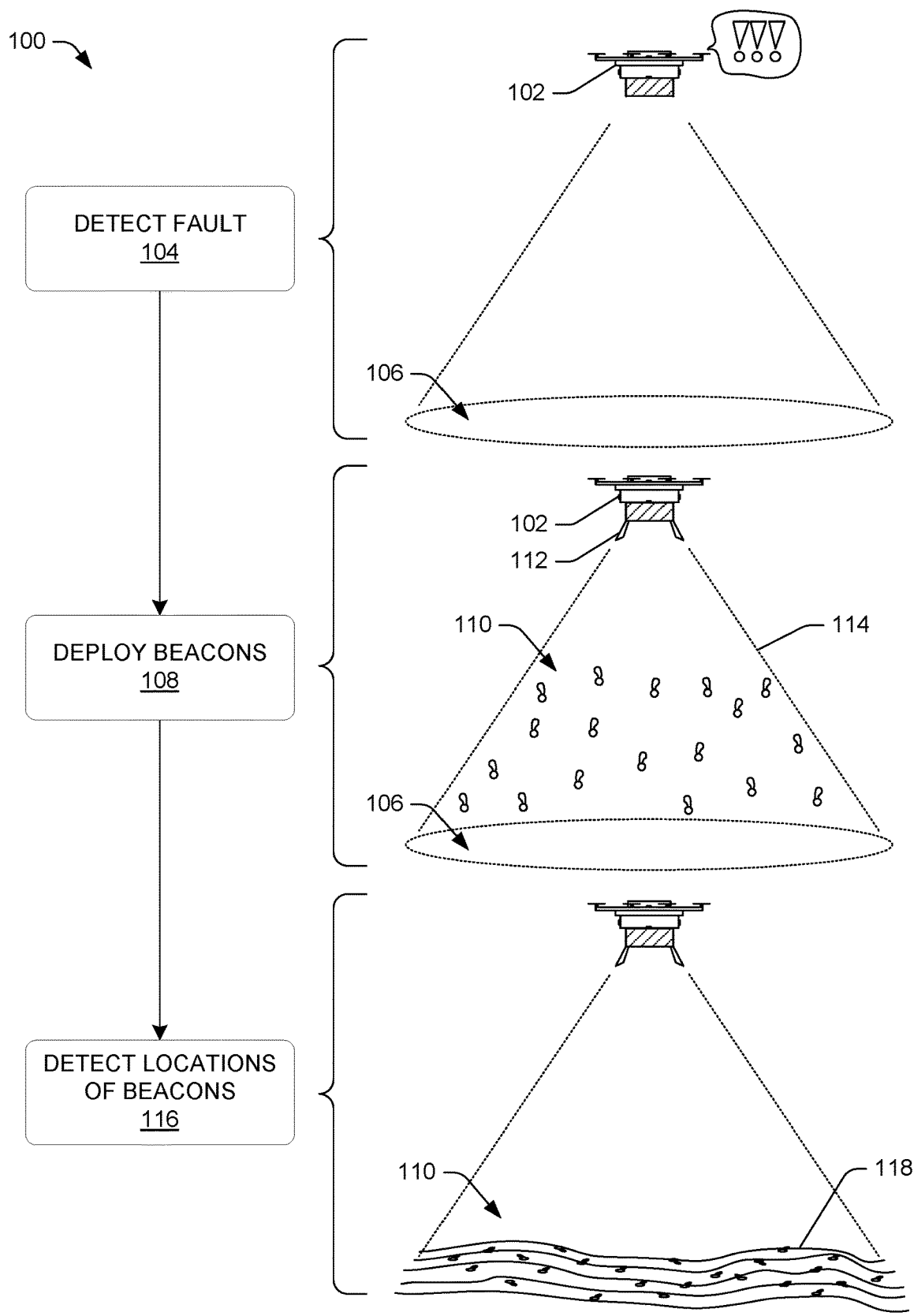
FIG. 1 is a pictorial flow diagram of an illustrative process to deploy and locate navigation beacons from an unmanned aerial vehicle (UAV).

This disclosure is directed to use of deployable navigation beacons that can be deployed from a vehicle, such as an unmanned aerial vehicle (UAV), in an event of a loss of position or orientation of the vehicle, such as after a sensor system failure (e.g., Global Positioning System (GPS) failure, stereo camera failure, etc.). After deployment of the navigation beacons, the vehicle may detect locations of the navigation beacons about one or more surfaces (e.g., the ground, a building structure, etc.). Locations of the navigation beacons may be determined by localization and used for position and orientation tracking using Simultaneous Localization and Mapping (SLAM) algorithms adapted to the detected unique three-dimensional (3D) features or using other similar algorithms. The vehicle may then perform control operations based on the resolved locations, which may be mapped as a surface relative to the vehicle, such as a detailed terrain. For example, UAV may maneuver to land proximate to the navigation beacons after resolving locations of the navigation beacons as a continuous surface.

The navigation beacons may output a visual signal (e.g., a light), a auditory signal (e.g., a sound), and/or a radio signal. In some embodiments, each navigation beacon may include a different or unique signal (e.g., a different wavelength or pulses of light, sound, or radio waves), which may enable the vehicle to independently resolve a location of each navigation beacon. For example, all navigation beacons may output light, but the wavelength of light and/or pulse patterns of the light may be different for each navigation beacon.

The navigation beacons may be deployed for a number of reasons, and in response to a triggering event. For example, the deployment may be in response to malfunction or unexpected data (or lack thereof) from a global positioning system (GPS), magnetometer, gyroscope, accelerometer, camera, bus connecting a sensor to a processor, and/or other devices that providing inputs to a vehicle controller and/or navigation system.

The vehicle and/or the navigation beacons may include devices to cause the navigation beacons to be randomly distributed about an area proximate the vehicle, such as below an aircraft. In some embodiments, the vehicle may eject the navigation beacons to cause the beacons to disperse around the vehicle. In various embodiments, the navigation beacons may include one or more wings or other features to cause the navigation beacons to travel at least partially laterally away from the vehicle.

In some embodiments, the vehicle may deploy a first portion of the navigation beacons to determine a first mapping of a surface and then later deploy a second portion of the navigation beacons to determine a second mapping of the surface or a different surface. For example, a UAV may deploy the first portion to resolve a location of the ground and then may deploy or eject a second portion to determine locations of any obstacles, such as adjacent buildings, trees, fences, or other obstacles.

The techniques, apparatuses, and systems described herein may be implemented in a number of ways. Example implementations are provided below with reference to the following figures.

FIG. 1 is a pictorial flow diagram of an illustrative process 100 to deploy and locate navigation beacons from an unmanned aerial vehicle (UAV) 102. However, navigation beacons may be deployed from other types of vehicles, such as automobiles, maritime vessels, and piloted vehicles for similar purposes.

At 104, the UAV 102 may detect a fault that prevents the UAV from accurately resolving a location or orientation of the UAV 102, such as with reference to a surface 106 (e.g., the ground, a structure, etc.). The fault may be a malfunction of a sensor or communication mechanism associated with the sensor. The fault may a quality of data obtained based on environmental conditions, which prevent the sensor from providing useful data for the UAV 102 to resolve a position and/or orientation. For example, if the UAV relies on images from a stereo camera to resolve a position of the ground relative to the UAV, then heavy fog, heavy rain, or possibly complete darkness may prevent the UAV from detecting the ground based on a type of sensor used and/or other factors. In this example, the sensor (e.g., the stereo camera) may be working properly, but the received data may not be useful for the UAV 102 to resolve a position and/or orientation.

At 108, the UAV 102 may deploy navigation beacons 110 from the UAV 102, such as from a repository 112 of the UAV 102. The repository may be a cargo hold (bay), locations external to a fuselage or body of the UAV, locations proximate to rotors or propulsion units of the UAV 102, and/or other locations that can couple navigation beacons 110 to the UAV to enable selective deployment of the navigation beacons or a portion of the navigation beacons 110. As an example, the navigation beacons may be stored in a cargo hold and deployed from the cargo hold when one or more doors of the cargo hold are opened to allow the navigation beacons to exit the cargo hold, and thus become uncoupled from the UAV. As used herein, the term "coupled" includes navigation beacons stored in a cargo hold, but possibly not individually secured within the cargo hold.

The UAV 102 may deploy the navigation beacons 110 in response to a trigger event. In some embodiments, the trigger event may be a loss of reliable orientation and/or position data, possibly in combination with other data. For example, loss of orientation and/or position data, at least momentarily, may not warrant deployment of the navigation beacons unless other factors are present, such as the UAV's last known location is within a threshold distance from the surface 106. When the UAV is above the threshold distance, the UAV may delay deployment of the navigation beacons in an attempt to obtain reliable orientation and/or position data, at least for a threshold amount of time before deploying the navigation beacons 110. Other trigger events and/or conditions may be implemented to cause the UAV 102 to deploy the navigation beacons 110 in appropriate situations, and refrain from deploying the navigation beacons prematurely, and thus "wasting" use of the navigation beacons or deploying the navigation beacons in inopportune circumstances (e.g., at an altitude that is too high to obtain reliable data from deployed navigation beacons, when orientation and/or positional data is only lost for a brief moment, etc.).

The UAV 102 and/or the navigation beacons 110 may include features to cause the navigation beacons to disperse from the UAV about a dispersion envelope 114, which may be defined by an angle toward the ground. The angle may not exceed 180 degrees for practical purposes since the navigation beacons may not include devices to cause upward lift (e.g., flight), and thus will drop toward the ground. The angle may be between 45 degrees and 90 degrees in some embodiments. The angle and size the dispersion envelope 114 may determine an area of coverage of the navigation beacons 110 when they land on the ground and/or land on other surfaces. To cause the navigation beacons to disperse about the dispersion envelope 114, the UAV 102 may eject the navigation beacons with at least some lateral force (e.g., biasing device, pneumatic force, combustion force, etc.) In some embodiments, the navigation beacons may include wings and/or other features that cause the beacons to travel laterally during a downward descent. For example, the navigation beacons 110 may include a wing shaped similar to conifer seeds, which cause the navigation beacons to travel laterally during at least part of a descent.

At 116, the UAV 102 may detect locations of the navigation beacons. The UAV 102 may delay a detection for a predetermined amount of time, such as an anticipated amount of time to allow the navigation beacons to land proximate the surface 106 or in response to a different trigger event. The different trigger event may be a termination of a signal, such as an auditory noise made by the navigation beacons during a descent (e.g., caused by air passing over or through a feature of the navigation beacon, etc.). Other devices, described below, may be used to create the different trigger event.

The UAV 102 may determine locations of the navigation beacons based on signals output by the navigation beacons, such as auditory signals, visual signals, and/or radio signals. The UAV 102 may determine locations of the navigation beacons by detecting locations of the navigation beacons by sensors, such as an array of microphones or a plurality of radio receivers, or by an imaging device. The UAV 102 may include a component to perform position and orientation tracking using Simultaneous Localization and Mapping (SLAM) algorithms adapted to the detected unique three-dimensional (3D) features, which may define a resolved surface 118, which may include contours defined by algorithms based on unique locations of the deployed navigation beacons.

In accordance with one or more embodiments, the vehicle may perform control operations based on the resolved locations of the navigation beacons, which may be mapped as a surface relative to the vehicle. For example, UAV may land proximate to the navigation beacons after resolving locations of the navigation beacons as a continuous surface.

Figure 2:
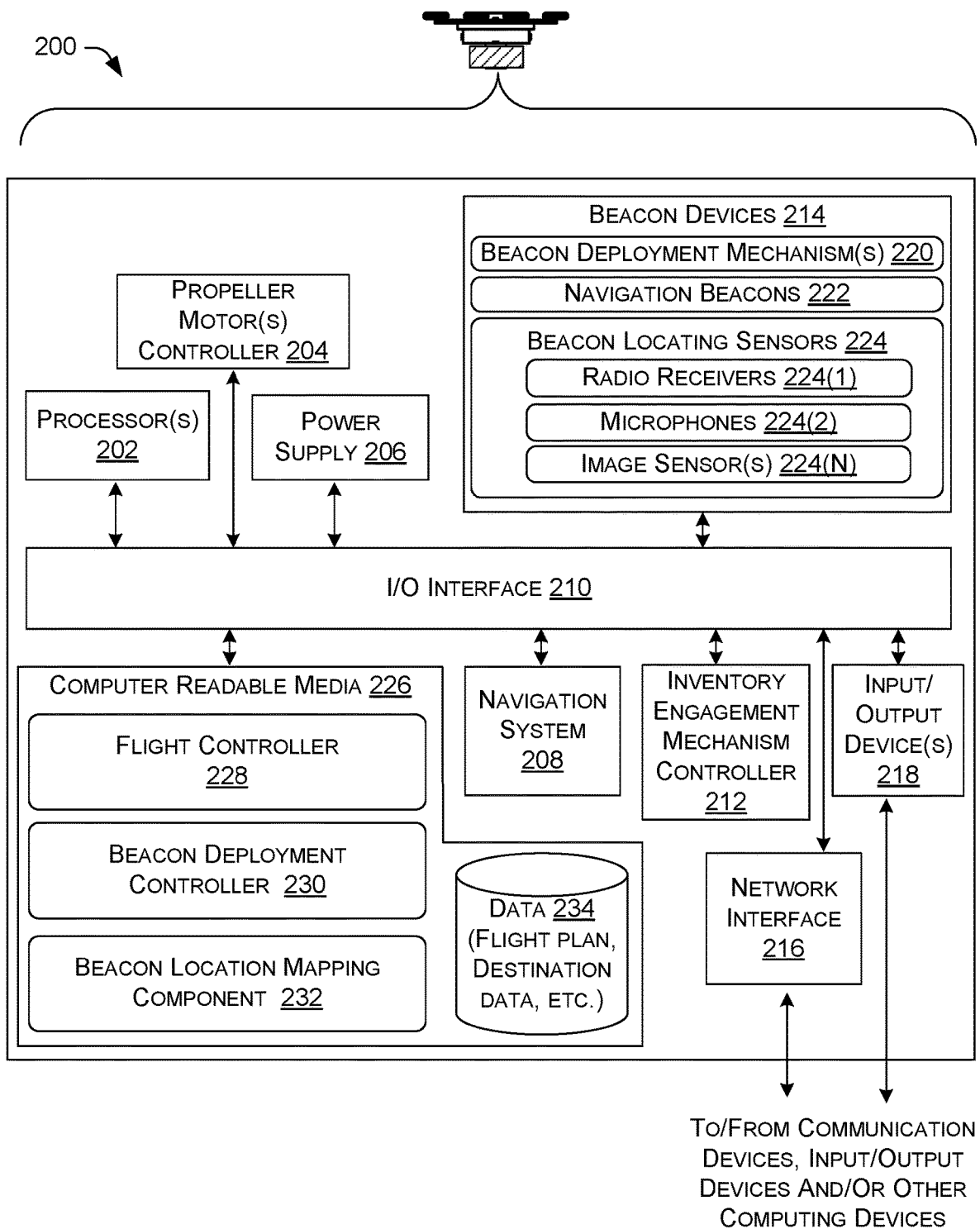
FIG. 2 is a block diagram of an illustrative UAV architecture configured with navigation beacons.

FIG. 2 is a block diagram of an illustrative UAV architecture 200. The UAV architecture 200 may be used to implement the various systems, devices, and techniques discussed above. In the illustrated implementation, the UAV architecture 200 includes one or more processors 202, coupled to a non-transitory computer readable media 226 via an input/output (I/O) interface 210. The UAV architecture 200 may also include a propeller motor controller 204, power supply module 206 and/or a navigation system 208. The UAV architecture 200 further includes an inventory engagement mechanism controller 212 to interact with an item for delivery, beacon devices to facilitate determination of orientation and/or location in an event of a malfunction or interruption of navigation or control data, a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 226 may be configured to store executable instructions/modules, data, flight paths, and/or data items accessible by the processor(s)

202. In various implementations, the non-transitory computer readable media 226 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 226 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 226, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 226) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 226, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a Global Navigation Satellite System (GNSS), a GPS, or other similar system that can be used to navigate the UAV to and/or from a location. The inventory engagement mechanism controller 212 communicates with the actuator(s) or motor(s) (e.g., a servo motor) used to engage and/or disengage inventory, such as the item. For example, when the UAV is positioned over a level surface at a delivery location, the inventory engagement mechanism controller 212 may provide an instruction to a motor that controls the inventory engagement mechanism to release an item.

The network interface 216 may be configured to allow data to be exchanged between the UAV architecture 200, other devices attached to a network, such as other computer systems, and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

The input/output devices 218 may, in some implementations, include accelerometers and/or other input/output devices commonly used in aviation. Multiple input/output devices 218 may be present and controlled by the UAV architecture 200. One or more of these sensors may be utilized to assist in landings as well as avoiding obstacles during flight.

The beacon devices (also referred to as navigation beacons devices) may include one or more beacon deployment mechanism(s) 220, navigation beacons 222, and beacon locating sensors 224. The beacon deployment mechanism(s) 220 may enable coupling of the navigation beacons 222 to the UAV (possibly in a container such as a cargo hold or other container). The beacon deployment mechanism(s) 220 may be configured to cause selective deployment of the navigation beacons 222, such as by uncoupling from the navigation beacons 222 or by causing actuation of one or more doors or other devices that cause the navigation beacons 222 to fall from the UAV. In some embodiments, the navigation beacons 222 may be configured to release a portion of the navigation beacons in a first deployment and a second portion of the navigation beacons 222 in a second deployment. Multiple deployments are possible, possibly exceeding two deployments depending on the configuration of the beacon devices 214. For example, if the navigation beacons 222 are stored in a cargo hold, then multiple cargo holds or subdivisions thereof may be used when multiple deployments are desired. The beacon deployment mechanism(s) 220 may cause deployment by imparting a force on the navigation beacons 222, such as an explosive force, a pneumatic force, a biasing force, or other forces (stored as potential energy) to eject the navigation beacons from the UAV, possibly with at least some lateral force component to cause the navigation beacons to disperse about a desired surface area below or proximate to the UAV. For example, an ejection force may be generated by a $CO_2$ container, gun powder, or a leaf spring. In various embodiments, the beacon deployment mechanism(s) 220 may be configured to deploy multiple of the navigation beacons using a single action. For example, a single coupling device may be actuated to cause deployment of multiple of the navigation beacons 222, such as by opening a door to a cargo hold, moving a structure that secures multiple navigation beacons 222, and the like. The beacon deployment mechanism(s) 220 may receive an input from a beacon deployment controller 230, discussed below, to cause deployment of the navigation beacons 22, or a portion thereof.

The navigation beacons 222 may be compact and relatively lightweight devices that can be carried by the UAV during typical operations, such as while the UAV transports an item during a delivery. In various embodiments, the UAV may deploy as few as a single navigation beacon, which may provide some orientation information for use in control of the UAV. In some embodiments, the navigation beacons 222 may have a quantity of three or more depending on capacities of the UAV. Typically, a minimum of three locations are used to define a basic planar surface. However, additional locations provide more information about a topography of a surface, such as the ground, which may not be planar, but may include hills, valleys, and/or other features. Thus, it may be desirable to deploy many navigation beacons 222. Additional navigation beacons 222 may also mitigate against failure of some navigation beacons (e.g., if some land in water, fall through a gutter, fail to properly operate, etc.). In various embodiments, the navigation beacons 222 may include a relatively flat shape, such as a general shape of a dime or other coin. However, other shapes and form-factors may be used (e.g., cubic, spherical, pyramid, etc.), which may accommodate compact storage in or on the UAV. In some embodiments, the navigation beacons 222 may include wings or other features to cause the navigation beacons to drift laterally during freefall, and thus spread out from one another. The navigation beacons may output a visual signal (e.g., a light), a auditory signal (e.g., a sound), and/or a radio signal. In some embodiments, each navigation beacon may include a different signal (e.g., a different wavelength or pulses of light, a different wavelength of sound, or a different frequency of radio waves), which may enable the vehicle to independently resolve a location of each navigation beacon.

The beacon locating sensors 224 may determine locations of the navigation beacons 222 after the navigation beacons are deployed from the UAV. The beacon locating sensors 224 may generate signals that enable triangulating a location of a beacon based on receipt of at least one of a radio signal from the beacon or a sound emitted by the beacon. The beacon locating sensors 224 may generate signals that enable processing a stereo image that depicts the beacon and is used to locate the beacon. The beacon locating sensors 224 may include at least one of radio receivers 224(1) (or transceivers), microphones 224(2) (possibly configured as a microphone array), or one or more image sensor(s) 224(N). The image sensor(s) may include at least one of a stereo camera, a laser position sensing system, a thermal image sensor, quad detectors configured generate images (signals) to determine location and depth of field of an object in an image. However other sensors may be used, such as radar based technologies or other sensors that are configured to determine a relative location of an object. The signals from the beacon locating sensors 224 may be processed by a beacon location mapping component 232 to determine locations of the beacons, and thus a relative location of a surface with respect to the UAV. The beacon locating sensors 224 may determine different types of signals, such as audio and light signals, for example.

In some embodiments, the computer readable media 226 may store the flight controller 228, the beacon deployment controller 230, and the beacon location mapping component 232. The components may access and/or write data 234, which may include flight plan data, log data, destination data, image data, and object data, and so forth. The flight controller 228 can control the travel or flight of the UAV 104 and may continually or from time to time provide controls to cause change in a velocity of the UAV, a change in heading, a change in altitude, a change in orientation, and/or other changes (e.g., pitch, roll, yaw, hover, etc.).

The beacon deployment controller 230 may monitor information for a trigger event or events and cause deployment of the navigation beacons 222 or a portion thereof via the beacon deployment mechanism(s) 220. For example, the beacon deployment controller 230 may receive system health information, which may include information about malfunctions of components, sensors, or other devices of the UAV and/or unanticipated operation of system and/or software, possibly caused by environmental conditions (e.g., by fog, by heavy rain, by electrical interference, etc.). In some embodiments, the beacon deployment controller 230 may also receive inputs such as a last known altitude or location, which may be used in determining whether to deploy the navigation beacons 222. For example, the beacon deployment controller 230 may be configured to refrain from deploying the navigation beacons 222 from an altitude that is greater than a threshold altitude. In the event of a loss of location and/or orientation when the UAV is above the threshold altitude, the beacon deployment controller 230 may delay deployment of the navigation beacons 222 possibly until the UAV has descended or after an elapse of time. The beacon deployment controller 230 may transmit a signal to the beacon deployment mechanism(s) 220 to cause deployment of the navigation beacons 222 or a portion thereof. When only a portion of the navigation beacons 222 are to be deployed, the beacon deployment controller 230 may indicate which navigation beacons to deploy.

The beacon location mapping component 232 may analyze signals from the beacon locating sensors 224 to determine locations of the navigation beacons 222, or a portion thereof (such as when only some navigations beacons are deployed while others are still capable of being deployed from the UAV). The beacon location mapping component 232 may use location determination algorithms, such as triangulation algorithms, to determine locations of navigation beacons relative to the UAV based on detected radio signals and/or audio signals. The beacon location mapping component 232 may use location determination algorithms, such as image analysis algorithms, to determine locations of navigation beacons relative to the UAV based on stereo imagery of one or more of the navigation beacons 222.

Once locations are determined, the beacon location mapping component 232 may determine a surface defined by the locations. For example, the locations of the navigation beacons may be determined by localization and used for position and orientation tracking using Simultaneous Localization and Mapping (SLAM) algorithms adapted to the detected unique three-dimensional (3D) features. In some embodiments, the beacon location mapping component 232 may generate a terrain profile of a surface, such as the ground, which may indicate presence of obstacles (e.g., trees, buildings, fences, etc.) and/or features (e.g., hills, valleys, water, etc.). Some obstacles and/or features may be determined by creating a 3D representation of the locations. However, some obstacles and/or features maybe determined based on other factors, such as an absence of locations in an area, which may indicate a water source where navigation beacons 222 may not be able to output signals for receipt by the beacon locating sensors 224, for example. As another example, navigation beacons may fall or slide off a steep roof, again resulting in an absence of locations in an area. Ultimately, the locations may be used to inform the flight controller 228, which may use this information to maintain flight, to land the UAV, to fly away from the locations, and/or to take other appropriate actions based on input data received and/or other data or protocols.

In some embodiments, the beacon location mapping component 232 may only resolve a general location of the navigation beacons, which may be rudimentary information that can be used to inform orientation and location of the UAV. For example, since the navigation beacons fall downward due to gravity, a sensed location after deployment will provide basic orientation information.

In various embodiments, the beacon location mapping component 232 may determine trajectories of at least some navigation beacons, such as when a navigation beacon deflects from a surface and changes a direct of travel while in flight. This change in direction may indicate a presence of an obstacle, such as a building, a fence, a tree, or another object, which may be used to inform control of the vehicle.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Figure 3:
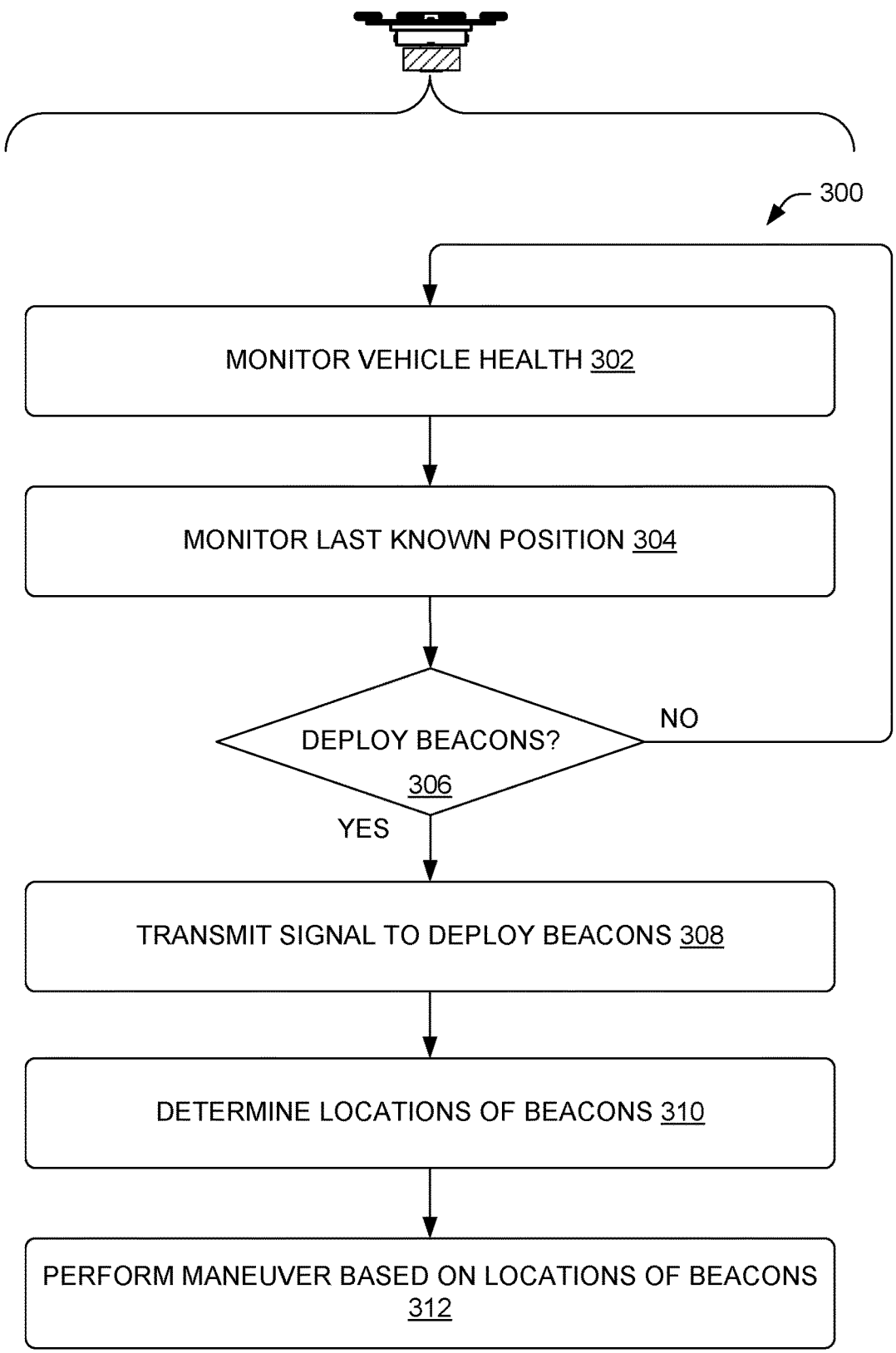
FIG. 3 is a flow diagram of an illustrative process to trigger deployment of navigation beacons and navigate a UAV based on determined locations of the deployed navigation beacons.
Figure 4:
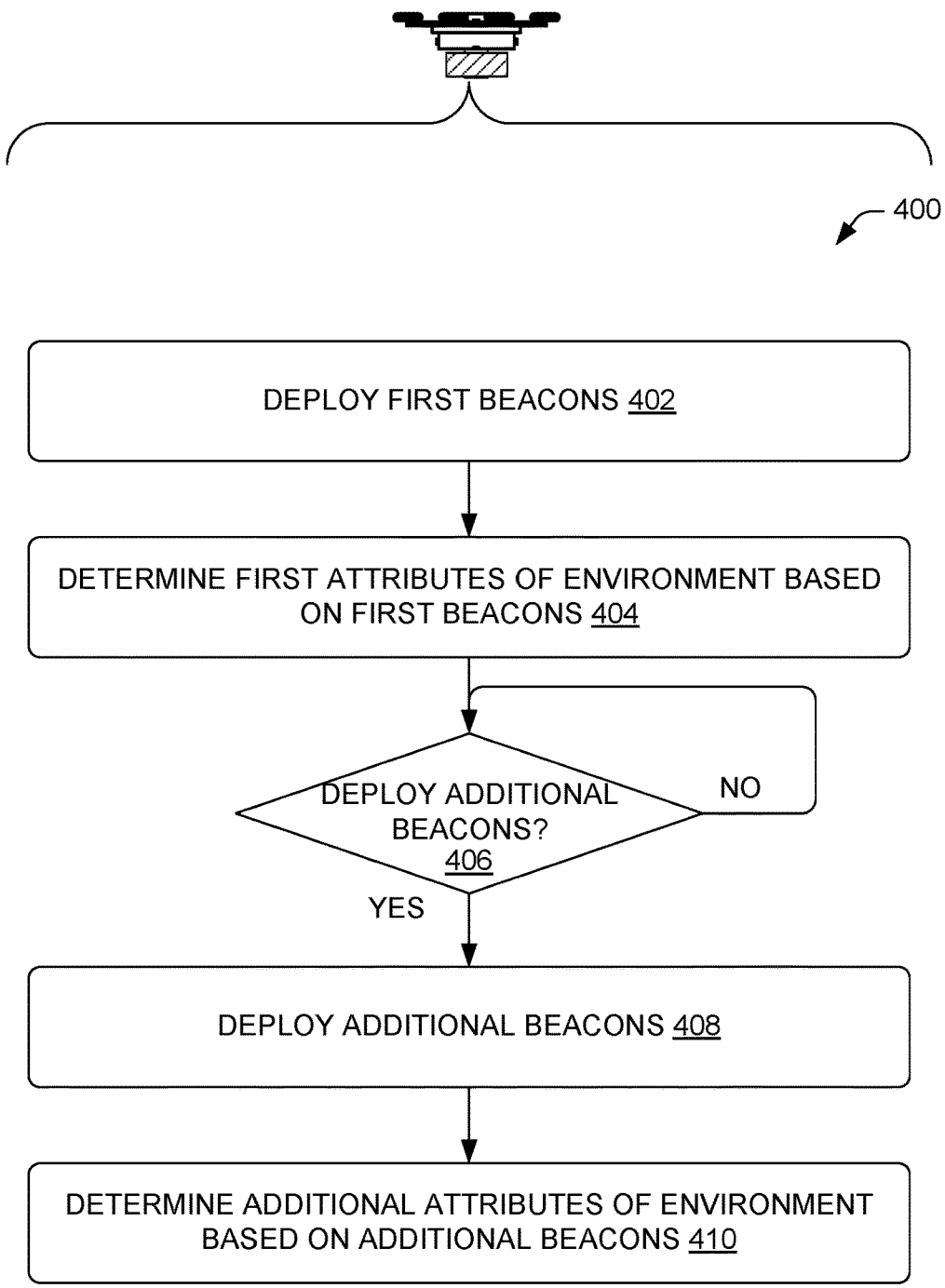
FIG. 4 is a flow diagram of an illustrative process to deploy some navigations beacons at a time after deployment of other navigation beacons.
Figure 5:
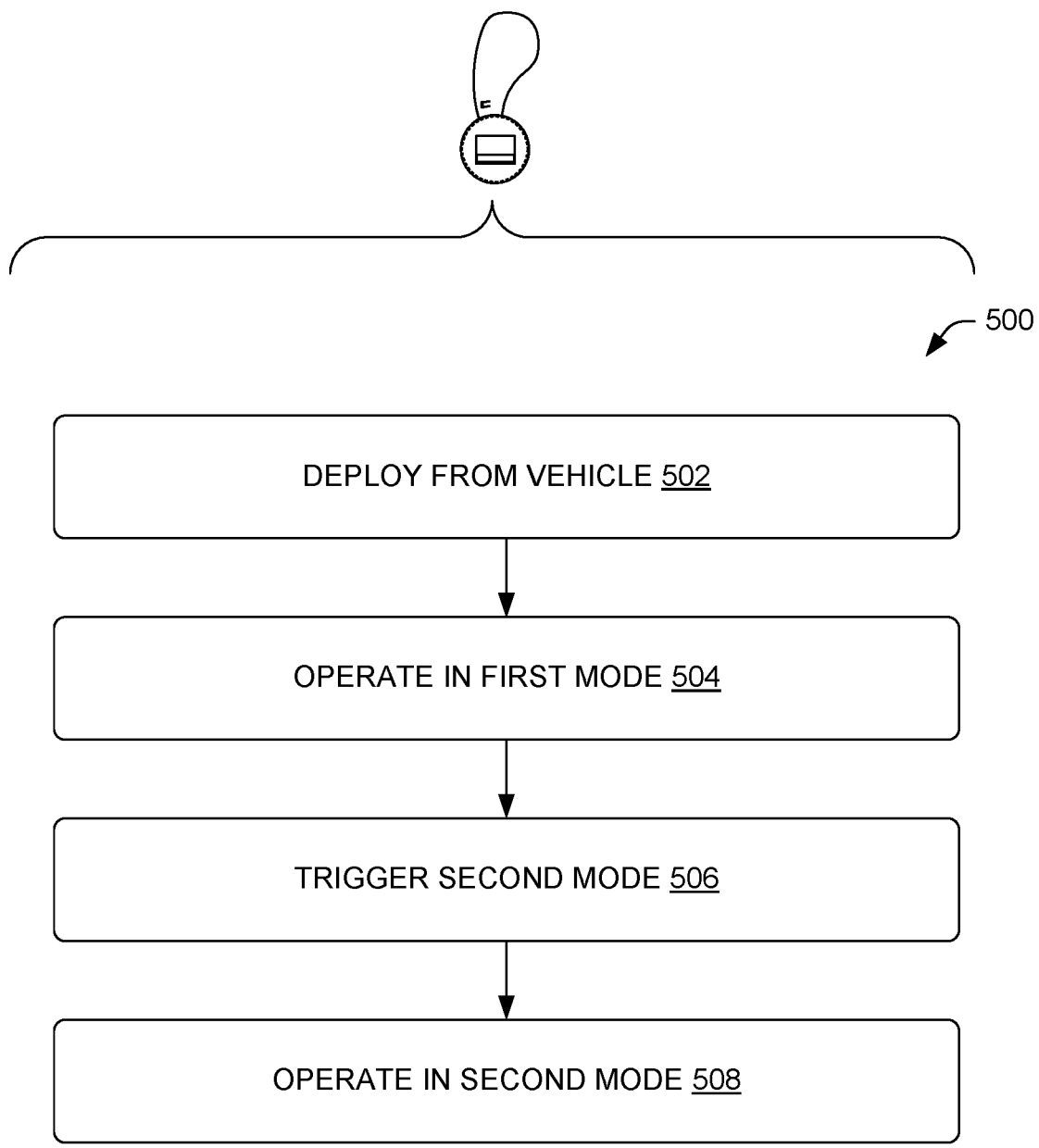
FIG. 5 is a flow diagram of an illustrative process of operation of navigation beacons deployed from a UAV.

FIGS. 3-5 are flow diagrams of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an illustrative process 300 to trigger deployment of navigation beacons and navigate a UAV based on determined locations of the deployed navigation beacons. The process 300 is described with reference to the process 100 and the UAV architecture 200 described above. Of course, the process 300 may be performed in other similar and/or different environments and/or by similar or different device architectures, possibly by other types of vehicles.

At 302, the beacon deployment controller 230 may monitor vehicle health. The vehicle health may be information pertaining to operation of sensor systems and/or other systems (e.g., communication systems, etc.). For example, the beacon deployment controller 230 may determine failure of a sensor system, such as a GPS system, magnetometer, gyroscope, accelerometer, camera, bus connecting a sensor to a processor, and/or other devices that providing inputs to a vehicle controller and/or navigation system. As another example, the beacon deployment controller 230 may determine that outputs of sensor systems or other systems are unexpected and/or fail to provide useful information as inputs to a vehicle controller and/or navigation system, such as image data of fog or heavy rain, or radio signals that include static/interference.

At 304, the beacon deployment controller 230 may determine a last known position and/or orientation of the UAV. For example, the beacon deployment controller 230 may access a last known altitude of the UAV and may use this information, in combination with other information, to determine whether to deploy the navigation beacons 222. As another example, the beacon deployment controller 230 may determine that a last known position is over a body of water, which may not be a suitable location to deploy a navigation beacon in some instances.

At 306, the beacon deployment controller 230 may determine whether to deploy the beacons (or a portion thereof) based at least in part on the information from the operation 302, the information from the operation 304, the information from the operations 302 and 304, and possibly other information. In some embodiments, other information may include a delay of time. For example, the beacon deployment controller 230 may determine that position and/or orientation information is unavailable and/or inaccurate, and may determine that the navigation beacons are to be deployed. However, the beacon deployment controller 230 may determine to delay deployment until the UAV reduces altitude or until after a passage of a predetermined amount of time to increase a likelihood that the deployed navigation beacons can be used to generate useful information for location and/or orientation. For example, if a last known position is over a body of water, then the beacon deployment controller 230 may delay deployment until the UAV travels an expected distance and is likely no longer over the body of water since some navigation beacons may not operate if in contact with water (e.g., due to sinking, due to movement in the water, etc.). However some navigation beacons may be waterproof and buoyant, and thus operate if they land in water. When the beacon deployment controller 230 determines not to deploy the navigation beacons (following the "no" route from the decision operation 306), then the process 300 may advance to the operation 302 and continue processing. When the beacon deployment controller 230 determines to deploy the navigation beacons (following the "yes" route from the decision operation 306), then the process 300 may advance to the operation 308.

At 308, the beacon deployment controller 230 may transmit a signal to the beacon deployment mechanism(s) 220 to cause deployment of the navigation beacons 222 or a portion of the navigation beacons 222. For example, the beacon deployment controller 230 may cause one or more doors to open to allow the navigation beacons to fall out of a cargo hold, or may cause ejection of the navigation beacons from the UAV as discussed herein. The navigation beacons deployed may be of the same type or may include different types of navigation beacons. For example, a first portion of the navigation beacons may be configured with aerodynamic properties to enable these beacons to reach the ground relatively quickly compared to a second portion of navigation beacons, which may be configured with dispersion features (e.g., wings, etc.) to cause the second portion of navigation beacons to disperse at least partially laterally from a location of deployment.

At 310, the beacon location mapping component 232 may determine locations of the navigation beacons that have been deployed. In some embodiments, the beacon location mapping component 232 may determine that the navigation beacons have stopped falling, such as by receiving sensor data that indicates the navigation beacons are not falling (e.g., by lack of sound associated with freefall, possibly via a whistle), by a signal initiated by contact with another surface such as the ground, and/or using other techniques. The beacon location mapping component 232 may determine locations by analyzing signals. For example, the beacon location mapping component 232 may use location determination algorithms, such as triangulation algorithms, to determine locations of navigation beacons relative to the UAV based on detected radio signals and/or audio signals. The beacon location mapping component 232 may use location determination algorithms, such as image analysis algorithms, to determine locations of navigation beacons relative to the UAV based on stereo imagery of one or more of the navigation beacons 222. In some embodiments, the beacon location mapping component 232 may determine a surface defined by the locations. For example, the locations of the navigation beacons may be determined by localization and used for position and orientation tracking using Simultaneous Localization and Mapping (SLAM) algorithms adapted to the detected unique three-dimensional (3D) features. In some embodiments, the beacon location mapping component 232 may generate a terrain profile of a surface, such as the ground, which may indicate presence of obstacles (e.g., trees, buildings, fences, etc.) and/or features (e.g., hills, valleys, water, etc.). Some obstacles and/or features may be determined by creating a 3D representation of the locations.

At 312, the flight controller 228 may use the locations determined at the operation 310 as input to determine instructions and/or signals to output to the propeller motor(s) controller 204, to maneuver the UAV. The maneuver may be causing the UAV to land on a surface mapped by the locations, to fly away from the locations, to maintain a current location, deposit a package proximate to the locations, and/or to perform other operations.

In various embodiments, the UAV may charge a power source for individual navigation beacons during operation of the UAV or prior to operation of the UAV. For example, the UAV may provide power to capacitors or batteries of the individual navigation beacons, which may power the navigation beacons after deployment. In various embodiments, the navigation beacons may include a power source that provides power for a duration of seconds or minutes, which may provide adequate time to obtain the locations of the navigation beacons for use by the UAV for determining location and/or orientation.

FIG. 4 is a flow diagram of an illustrative process 400 to deploy some navigations beacons at a time after deployment of other navigation beacons. The process 400 is described with reference to the process 100 and the UAV architecture 200 described above. Of course, the process 400 may be performed in other similar and/or different environments and/or by similar or different device architectures, possibly by other types of vehicles.

At 402, the beacon deployment controller 230 may cause deployment of a first portion of navigation beacons carried by the UAV. For example, the beacon deployment controller 230 may transmit a signal to a first beacon deployment mechanism that causes deployment of the first portion of navigation beacons. The first beacon deployment mechanism may be a first door to a first cargo hold, for example. The first beacon deployment mechanism may be a first ejection mechanism configured to eject the first portion of navigation beacons, such as by uncoupling a first restraint that couples the first portion of navigation beacons to an exterior of the UAV, causing a pneumatic ejection, and/or causing an ejection using other techniques and/or apparatuses discussed herein. The first portion of navigation beacons may be used to determine a relative location and/or orientation of the UAV with respect to the ground or a surface below the UAV.

At 404, the beacon location mapping component 232 may determine first locations of the first portion of navigation beacons. For example, the first portion of navigation beacons may have known identifiers that can be located independent from other portions of the navigation beacons. The beacon location mapping component 232 may determine the first locations and/or first terrain profile, which may enable the UAV to begin execute maneuvers to approach an area proximate the locations of the first portion of the navigation beacons.

At 406, the beacon deployment mechanism 230 may determine whether to deploy a second portion of navigation beacons. For example, the beacon deployment mechanism 230 may deploy the second portion of navigation beacons in various circumstances. A first circumstance may be that the UAV has traveled laterally and is no longer above the first locations of the first portion of the navigation beacons. A second circumstance may be that the first portion of navigation beacons did not enable the beacon location mapping component 232 to resolve complete information for location and/or orientation of the UAV, possibly due to failure of some navigation beacons, a distance from the navigation beacons, and/or for other reasons. A third reason may be to resolve other aspects of the environment, such as lateral features proximate to the UAV, which may be resolved after obtaining some location and/or orientation information using the first portion of the navigation beacons. When no additional navigation beacons are to be deployed, at least temporarily (following the "no" route from the decision operation 406), then the process 400 may delay, and continue at the decision operation 406, which may not result in a further deployment of navigation beacons. When additional navigation beacons are to be deployed (following the "yes" route from the decision operation 406), then the process 400 may continue to an operation 408 for further processing.

At 408, the beacon deployment controller 230 may cause deployment of an additional portion of navigation beacons carried by the UAV. For example, the beacon deployment controller 230 may transmit a signal to an additional (e.g., second, etc.) beacon deployment mechanism that causes deployment of the additional portion of navigation beacons.

The additional beacon deployment mechanism may be a second door to a second cargo hold, for example. The additional beacon deployment mechanism may be a second ejection mechanism configured to eject the additional portion of navigation beacons, such as by uncoupling a second restraint that couples the additional portion of navigation beacons to an exterior of the UAV, causing a pneumatic ejection, and/or causing an ejection using other techniques and/or apparatuses discussed herein. The additional portion of navigation beacons may be used to determine a relative location and/or orientation of the UAV with respect to the ground or a surface below the UAV. In some embodiments, the additional portion of navigation beacons may be used to determine lateral features, such as object adjacent to a location of the UAV, such as a location of a building, a fence, a tree, and/or other structures. The additional portion of navigation beacons may be deployed in a different away than the first portion of navigation beacons, such as with more lateral force to cause the additional beacons to detect interaction with objects adjacent to the UAV.

At 410, the beacon location mapping component 232 may determine additional locations of the additional portion of navigation beacons. For example, the additional portion of navigation beacons may have known identifiers that can be located independent from the first portion of the navigation beacons. The beacon location mapping component 232 may determine the additional locations and/or additional terrain profile, which may enable the UAV to begin execute maneuvers to approach an area proximate the locations of the additional portion of the navigation beacons. In some embodiments, the beacon location mapping component 232 may determine presence of adjacent object, obstacles, and/or features based on determining locations of the additional portion of navigation beacons. For example, the first portion of navigation beacons may be used to resolve location and/or orientation of the UAV. The addition portion of the navigation beacons may be used to resolve additional information, such as adjacent objects. The beacon location mapping component 232 may determine a location of an adjacent object by determining a change in a flight trajectory of one of the additional portion of navigation beacons, which may collide with an object and change course of flight (e.g., bounce off a fence, bounce off a building, bounce off a tree, etc.).

In some embodiments, additional portions of the navigation beacons may be available for deployment, such as a third portion, and so forth. The additional portions of the navigation beacons may be used for any of the purposes discussed herein.

FIG. 5 is a flow diagram of an illustrative process 500 of operation of navigation beacons deployed from a UAV. The process 500 is described with reference to the process 100 and the UAV architecture 200 described above. Of course, the process 500 may be performed in other similar and/or different environments and/or by similar or different device architectures, possibly by other types of vehicles. In some embodiments, the navigation beacon may perform only some of the operations described below in the process 500. The navigation beacon may be an active device (e.g., powered) or a passive device (e.g., not powered). Additional details about the navigation beacon are described with reference to FIGS. 6A-6C.

At 502, a navigation beacon may be deployed from the UAV. In some embodiments, the navigation beacon may actively uncouple from the UAV, such as by uncoupling from a restraining device on the UAV. In various embodiments, the navigation beacon may include a mechanism to assist with ejection from the UAV, such as a biasing device that stores potential energy that enable ejection of the navigation beacon from the UAV during or after decouple of the navigation beacon from the UAV.

At 504, the navigation beacon may operate in a first mode of operation. The first mode may be during downward flight of the UAV. The first mode of operation may or may not include emitting a signal for receipt by the beacon locating sensors 224 and for processing by the beacon location mapping component 232. For example, the navigation beacon may operate in the first mode to emit one of a sound, a radio signal, or a light. In some embodiments, the navigation beacon may emit a sound using a passive device, such as a whistle or other sound generating device that generates sound as the navigation beacon travels through air. This sound may be received by the UAV to indicate that navigation beacon is in flight and may not be ready to provide reliable location information for generating location and/or orientation information for the UAV for control of the UAV.

At 506, the navigation beacon may trigger operation in a second mode. The trigger may be a detected impact with a surface, such as the ground, a building, an object, or other feature. The navigation beacon may include a mechanism that detects impact, which may cause a mechanical movement (e.g., movement of a probe or button), an electrical change (e.g., change in resistance, a short, etc.), or other mechanisms capable of detecting impact with an object or flight of the navigation beacon (e.g., a gyro sensor, an accelerometer, etc.). In some embodiments, the trigger may be a delay of time. In various embodiments, the second mode may initiate at or immediately after deployment of the navigation beacon, and may overlap with the operation in the first mode. For example, a beacon may make a sound while freefalling through air (e.g., via a passive device), which may be the first mode, and may emit pulses of light, which may be the second mode, during and after the freefall to the ground.

At 508, the navigation beacon, in response to detecting the impact at the operation 506, may begin to operate in a second mode. In some instances, the navigation beacon may terminate the operation in the first mode when or after initiating operation in the second mode. The second mode of operation may include the navigation beacon emitting a signal for receipt by the beacon locating sensors 224 and for processing by the beacon location mapping component 232. For example, the navigation beacon may operate in the second mode to emit one of a sound, a radio signal, or a light. The beacon locating sensors 224 may detect this signal, which may be processed by the beacon location mapping component 232 to provide location and/or orientation information for the UAV for control of the UAV. As another example, the second mode may indicate impact with an adjacent object, such as a building, obstacle, or feature.

FIG. 6A shows a front elevation view of an illustrative navigation beacon 600. The navigation beacon 600 includes a housing 602, which may protect components during freefall and contact with a surface (e.g., the ground). The housing 602 may include a compact formfactor that enables compact and space-efficient storage of the navigation beacons by the UAV. For example, the housing 602 may be shaped like a coin with planar or nearly planar sides. The planar sides may prevent or reduce a likelihood that the navigation beacon 602 rolls after landing on a surface such as the ground. In some embodiments, the housing 602 may include aerodynamic features to expedite arrival of the navigation beacon at a surface, such as the ground. In various embodiments, the housing 602 may include dispersion features which cause the navigation beacon to drift or travel laterally from a location of deployment to scatter the navigation beacons about a great surface area.

The navigation beacon 600 may include a passive device 604 configured for detection by the beacon locating sensors 224. The passive device 604 may emit sound, emit light, reflect light, and/or may emit heat, for example. In some embodiments, the passive device 604 may be configured to emit heat or light in response to a chemical reaction. For example, the passive device may emit heat that is detectable by a thermal image sensor or may emit light that is detectable by an image sensor. A chemical reaction may be initiated by impact with a surface, such as to initiate mixture of different substances after impact. In various embodiments, the passive device 604 may generate sound based on airflow past the passive device. In some embodiments, the passive device 604 may be a retroreflector to reflect light back toward the beacon locating sensors. Other passive device components may be used to transmit signals to the beacon locating sensors 224 or enable detection of the navigation beacons via the beacon locating sensors 224.

FIG. 6B shows a front elevation view of an illustrative navigation beacon 600. The navigation beacon 610 includes a housing 612, which may protect internal components during freefall and contact with a surface (e.g., the ground). The housing 612 may include a compact formfactor that enables compact and space-efficient storage of the navigation beacons by the UAV. For example, the housing 612 may be shaped like a coin with planar or nearly planar sides. The planar sides may prevent or reduce a likelihood that the navigation beacon 612 rolls after landing on a surface such as the ground. The housing 612 may couple various components. In some embodiments, the housing 612 may include aerodynamic features to expedite arrival of the navigation beacon at a surface, such as the ground. In various embodiments, the housing 612 may include dispersion features which cause the navigation beacon to drift or travel laterally from a location of deployment to scatter the navigation beacons about a great surface area.

The navigation beacon 610 may include a logic board 614 coupled to the housing 612. The logic board 614 may be coupled to a power source 616. The power source may be a battery, a capacitor, a solar panel, a chemical reaction (e.g., to generate light or power), and/or other types of power sources. The logic board 614 may include functionality and/or hardware to emit at least one of light, radio signals, and/or sound. For example, when the navigation beacon 610 is configured to emit sound, the logic board 614 may include or be coupled to a speaker. When the navigation beacon 610 is configured to emit light, the logic board 614 may include or be coupled to an light emitting diode (LED) or other light emitting device.

In some embodiments, the navigation beacon 610 may include a sensor 608 to detect that that navigation beacon 610 is at rest and is stationary, and thus capable of providing accurate location information to the UAV. For example, the sensor 618 may be implemented as a motion sensor, a biasing sensor (e.g., a button that can be depressed or at least partially depressed when the navigation beacon 610 is resting on a surface, an accelerometer, and/or other types of sensors that can detect impact or a position of the navigation beacon 610. The sensor 618 may provide a signal to the logic board 614. In response to receiving the signal, the logic board 618 may initiate an operational mode or change an operational mode. For example, the navigation beacon 610 may initiate an operation mode to begin transmitting (broadcasting) a light signal, a radio signal, and/or a sound signal.

The navigation beacon 610 may change from a first operational mode to a second operational mode, where the second operational mode is different than the first operational mode. The second operational mode may be at least one of transmitting) a light signal, a radio signal, and/or a sound signal.

FIG. 6C shows a front elevation view of an illustrative navigation beacon 620. The navigation beacon 620 includes a housing 622, which may protect internal components during freefall and contact with a surface (e.g., the ground). The housing 622 may include a compact formfactor that enables compact and space-efficient storage of the navigation beacons by the UAV. For example, the housing 622 may be shaped like a coin with planar or nearly planar sides. The planar sides may prevent or reduce a likelihood that the navigation beacon 622 rolls after landing. The housing 622 may contain or couple to various components. In some embodiments, the housing 622 may include aerodynamic features to expedite arrival of the navigation beacon at a surface, such as the ground. In various embodiments, the housing 622 may include dispersion features which cause the navigation beacon to drift or travel laterally from a location of deployment to scatter the navigation beacons about a great surface area.

The navigation beacon 620 may include a logic board 624 coupled to the housing 622. The logic board 624 may be coupled to a power source 626. The power source may be a battery, a capacitor, a solar panel, a chemical reaction (e.g., to generate light or power), and/or other types of power sources. The logic board may include functionality and/or hardware to emit at least one of light, radio signals, and/or sound. For example, when the navigation beacon 620 is configured to emit sound, the logic board 624 may include or be coupled to a speaker. When the navigation beacon 620 is configured to emit light, the logic board 624 may include or be coupled to an light emitting diode (LED) or other light emitting device. However, light may be generated by a chemical reaction without a light emitting device.

In some embodiments, the navigation beacon 620 may include a sensor 628 to detect that that navigation beacon 620 is at rest and is stationary, and thus capable of providing accurate location information to the UAV. For example, the sensor 628 may be implemented about a perimeter of the housing 622 at least at a location likely to contact a surface after a free fall. The location may be opposite or nearly opposite a side of the housing 622 that is coupled to a wing 630. The sensor may emit a signal upon contact with a surface, such as the ground. The sensor 628 may determine a change in capacitance or resistance after deformation of a first layer of the housing 622 with respect to a second layer of the housing (e.g., an internal layer), in response to deformation of the first layer from impact with the surface (e.g., the ground, etc.). Other devices may be used to determine impact, such as the sensors described with respect to the sensor 618 described with reference to FIG. 6B. For example, the sensor 628 may be a motion sensor, a biasing sensor (e.g., a button that can be depressed or at least partially depressed when the navigation beacon 620 is resting on a surface, an accelerometer, and/or other types of sensors that can detect impact or a position of the navigation beacon 620. The sensor 628 may provide a signal to the logic board 624. In response to receiving the signal, the logic board 628 may initiate an operational mode or change an operational mode. For example, the navigation beacon 620 may initiate an operation mode to begin transmitting (broadcasting) a light signal, a radio signal, and/or a sound signal. The navigation beacon 620 may change from a first operational mode to a second operational mode, where the second operational mode is different than the first operational mode. The second operational mode may be at least one of transmitting) a light signal, a radio signal, and/or a sound signal.

The wing 630 may be coupled to the housing 622 and may cause the navigation beacon 620 to travel at least partially laterally during freefall from a UAV. For example, the wing 630 and housing 622 may include aerodynamic features similar to a conifer seed, which causes the navigation beacon 620 to land laterally further away from a point of deployment than a navigation beacon without the wing. In some embodiments, the navigation beacon 620 may include a sound generating device 632, such as a whistle, which may cause a sound to be emitted during freefall of the navigation beacon 620. The sound generating device 632 may emit sound that, when received by the UAV, indicates that the navigation beacon 620 has not landed yet and may not yet be a valid source of location information. Once the navigation beacon 620 lands and is at rest and stationary, the sound may terminate, and the navigation beacon may be used by the UAV for location information. For example, the first mode of operation may be generation of sound by the sound generating device 632, which may terminate when the navigation beacon 620 lands on the ground or lands on a different surface.

FIG. 6D shows a front elevation view of an illustrative navigation beacon 640. The navigation beacon 640 includes a housing 642, which may protect internal components during freefall and contact with a surface (e.g., the ground). The housing 642 may include a compact formfactor that enables compact and space-efficient storage of the navigation beacons by the UAV. For example, the housing 642 may be shaped like a coin with planar or nearly planar sides. The planar sides may prevent or reduce a likelihood that the navigation beacon 642 rolls after landing. The housing 642 may contain or couple to various components. In some embodiments, the housing 642 may include aerodynamic features to expedite arrival of the navigation beacon at a surface, such as the ground. In various embodiments, the housing 642 may include dispersion features which cause the navigation beacon to drift or travel laterally from a location of deployment to scatter the navigation beacons about a great surface area.

The navigation beacon 640 may include a logic board 644 coupled to the housing 642. The logic board 644 may be coupled to a power source 646. The power source may be a battery, a capacitor, a solar panel, a chemical reaction (e.g., to generate light or power), and/or other types of power sources. The logic board may include functionality and/or hardware to emit at least one of light, radio signals, and/or sound. For example, when the navigation beacon 640 is configured to emit sound, the logic board 644 may include or be coupled to a speaker. When the navigation beacon 640 is configured to emit light, the logic board 644 may include or be coupled to an light emitting diode (LED) or other light emitting device. However, light may be generated by a chemical reaction without a light emitting device.

In some embodiments, the navigation beacon 640 may include a sensor 648 to detect that that navigation beacon 640 is at rest and is stationary, and thus capable of providing accurate location information to the UAV. For example, the sensor 648 may be implemented about a perimeter of the housing 642 at least at a location likely to contact a surface after a free fall. The location may be opposite or nearly opposite a side of the housing 642 that is coupled to a first wing 650 and a second wing 652. The sensor may emit a signal upon contact with a surface, such as the ground. The sensor 648 may determine a change in capacitance or resistance after deformation of a first layer of the housing 642 with respect to a second layer of the housing (e.g., an internal layer), in response to deformation of the first layer from impact with the surface (e.g., the ground, etc.). Other devices may be used to determine impact, such as the sensors described with respect to the sensor 618 described with reference to FIG. 6B. For example, the sensor 648 may be a motion sensor, a biasing sensor (e.g., a button that can be depressed or at least partially depressed when the navigation beacon 640 is resting on a surface, an accelerometer, and/or other types of sensors that can detect impact or a position of the navigation beacon 640. The sensor 648 may provide a signal to the logic board 644. In response to receiving the signal, the logic board 648 may initiate an operational mode or change an operational mode. For example, the navigation beacon 640 may initiate an operation mode to begin transmitting (broadcasting) a light signal, a radio signal, and/or a sound signal. The navigation beacon 640 may change from a first operational mode to a second operational mode, where the second operational mode is different than the first operational mode. The second operational mode may be at least one of transmitting) a light signal, a radio signal, and/or a sound signal.

The first wing 650 and the second wing 652 may be coupled to the housing 642 and may cause the navigation beacon 640 to travel at least partially laterally during freefall from a UAV. For example, the wing 650 and housing 642 may include aerodynamic features similar to a seed of a sycamore tree, which causes the navigation beacon 640 to land laterally further away from a point of deployment than a navigation beacon without the wing. The wings may be configured similar to a paper helicopter design, which cause the housing 642 to rotate about a vertical axis during freefall, slowing freefall and allowing lateral travel due to wind, for example. In some embodiments, the navigation beacon 640 may include one or more sound generating device 654, such as a whistle, which may cause a sound to be emitted during freefall of the navigation beacon 640. The sound generating device(s) 654 may emit sound that, when received by the UAV, indicates that the navigation beacon 640 has not landed yet and is not yet a valid source of location information. Once the navigation beacon 620 lands and is at rest and stationary, the sound may terminate, and the navigation beacon may be used by the UAV for location information. For example, the first mode of operation may be generation of sound by the sound generating device(s) 654, which may terminate when the navigation beacon 640 lands on the ground or lands on a different surface.

Figure 7A:
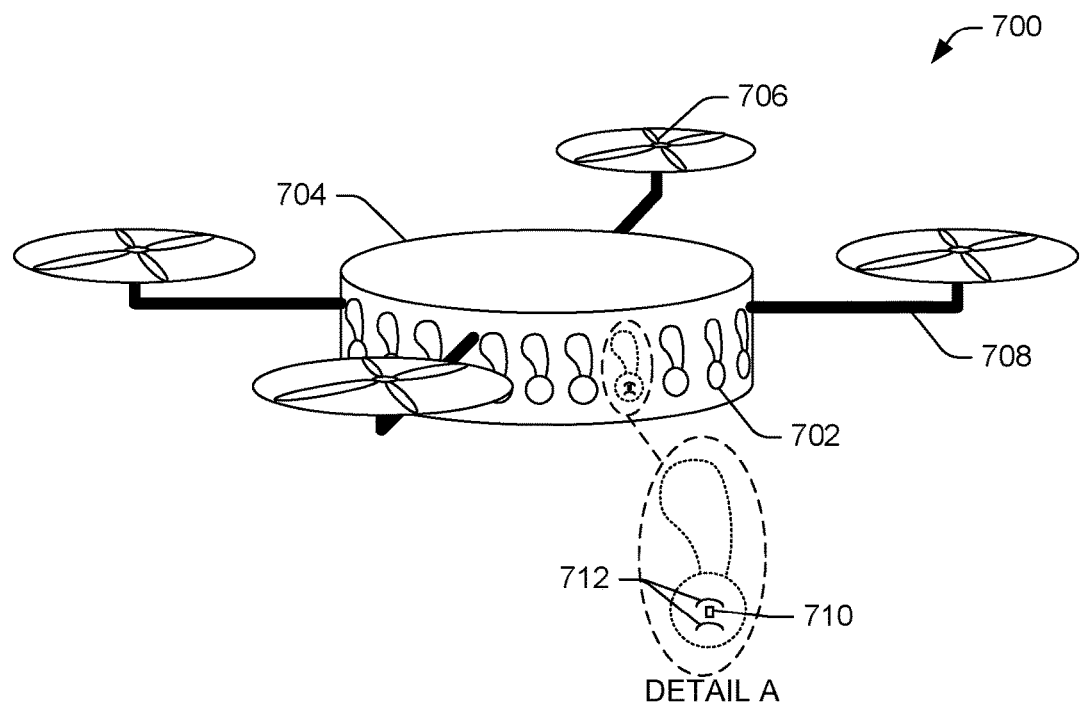
FIGS. 7A-7C show perspective views of illustrative UAVs having navigation beacons coupled to the UAVs.

FIG. 7A shows a perspective view of an illustrative UAV 700 having navigation beacons 702 coupled to the UAV 700. The UAV 700 may include a body (fuselage, frame, etc.) 704 and propulsion units 706 that generate lift. The propulsion units 706 may be coupled to the body 704 by members 708. The UAV 700 may be formed in different configurations to enable flight. In some embodiments, the UAV 700 may include a wing to generate lift in forward flight. The UAV 700 may include one or more device to couple to a package for transport of the package.

The UAV 700 may include coupling device 710 to couple to individual navigation beacons of the navigation beacons 702, as shown in Detail A in FIG. 7A. In some embodiments, one or more biasing devices 712 (e.g., coil spring, leaf spring, etc.) may be positioned between the body 704 and the navigation beacon to store potential energy when the navigation beacon is coupled to the UAV 700, and release the potential energy to eject the navigation beacon with at least some lateral force. The coupling device 710 may be linked with other coupling devices to enable a single mechanism to decouple at least a portion (some, but possibly not all) of the navigation beacons from the UAV 700. For example, a mechanism may move to actuate multiple of the coupling devices to cause simultaneous decoupling of a portion or all of the navigation beacons. Although the navigation beacons 702 are shown as including at least one wing, other types of navigation beacons without wings may be coupled and deployed in this manner.

Figure 7B:
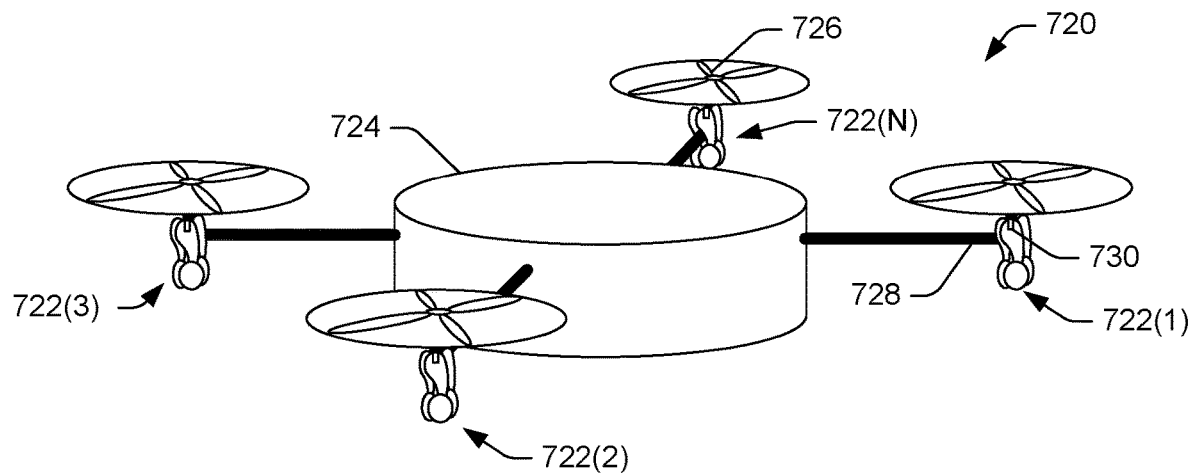

FIG. 7B shows a perspective view of an illustrative UAV 720 having navigation beacons 722(1)-(N) (collectively navigation beacons 722) coupled to the UAV 720. The UAV 720 may include a body (fuselage) 724 and propulsion units 726 that generate lift. The propulsion units 726 may be coupled to the body 724 by members 728. The UAV 720 may be formed in different configurations to enable flight. In some embodiments, the UAV 720 may include a wing to generate lift in forward flight. The UAV 720 may include one or more device to couple to a package for transport of the package.

The UAV 720 may include coupling device 710 to couple to individual navigation beacons of the navigation beacons 722 to the member 728 proximate to one of the propulsion units 726. By locating at least some navigation beacons in this location, downward thrust from the propulsion units 728 may assist in deployment and scatter of the navigation beacons after the coupling device decouples from the navigation beacons. The coupling device 730 may be linked with other coupling devices to enable a single mechanism to decouple at least a portion (some, but possibly not all) of the navigation beacons from the UAV 720. For example, a mechanism may move to actuate multiple of the coupling devices to cause simultaneous decoupling of a portion or all of the navigation beacons. Although the navigation beacons 702 are shown as including at least one wing, other types of navigation beacons without wings may be coupled and deployed in this manner.

Figure 7C:
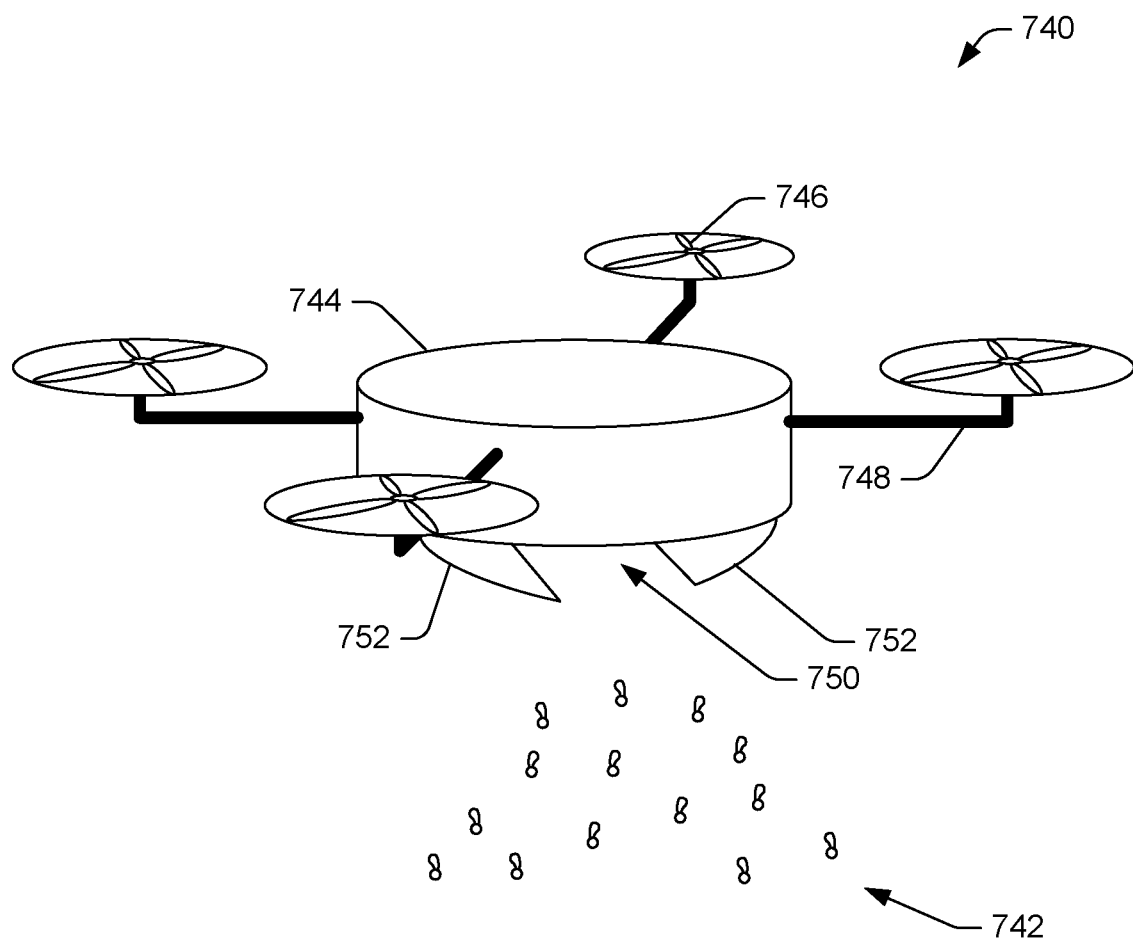

FIG. 7C shows a perspective view of an illustrative UAV 740 having navigation beacons 742 coupled to the UAV 740 (e.g., within a cargo hold). The UAV 740 may include a body (fuselage) 744 and propulsion units 746 that generate lift. The propulsion units 746 may be coupled to the body 744 by members 748. The UAV 740 may be formed in different configurations to enable flight. In some embodiments, the UAV 740 may include a wing to generate lift in forward flight. The UAV 740 may include one or more device to couple to a package for transport of the package.

The UAV 740 may include cargo hold 750 to couple (restrain) the navigation beacons of the navigation beacons 742. The cargo hold 750 may include one or more doors 752, which may selectively open to release and enable the navigation beacons to decouple from the UAV 740. In some embodiments, the UAV 740 may include multiple cargo holds that enable deployment of a portion of the navigation beacons from the UAV when the cargo holds are opened at different times. Although the navigation beacons 702 are shown as including at least one wing, other types of navigation beacons without wings may be coupled and deployed in this manner.

In some embodiments, a UAV may include navigation beacons stored and deployed using a combination of the configurations described above, such as using a cargo hold and coupling some navigation beacons to a fuselage and/or member proximate to a propulsion unit. Such arrangement may enable separate deployment of different portions of the navigation beacons.

Figure 8:
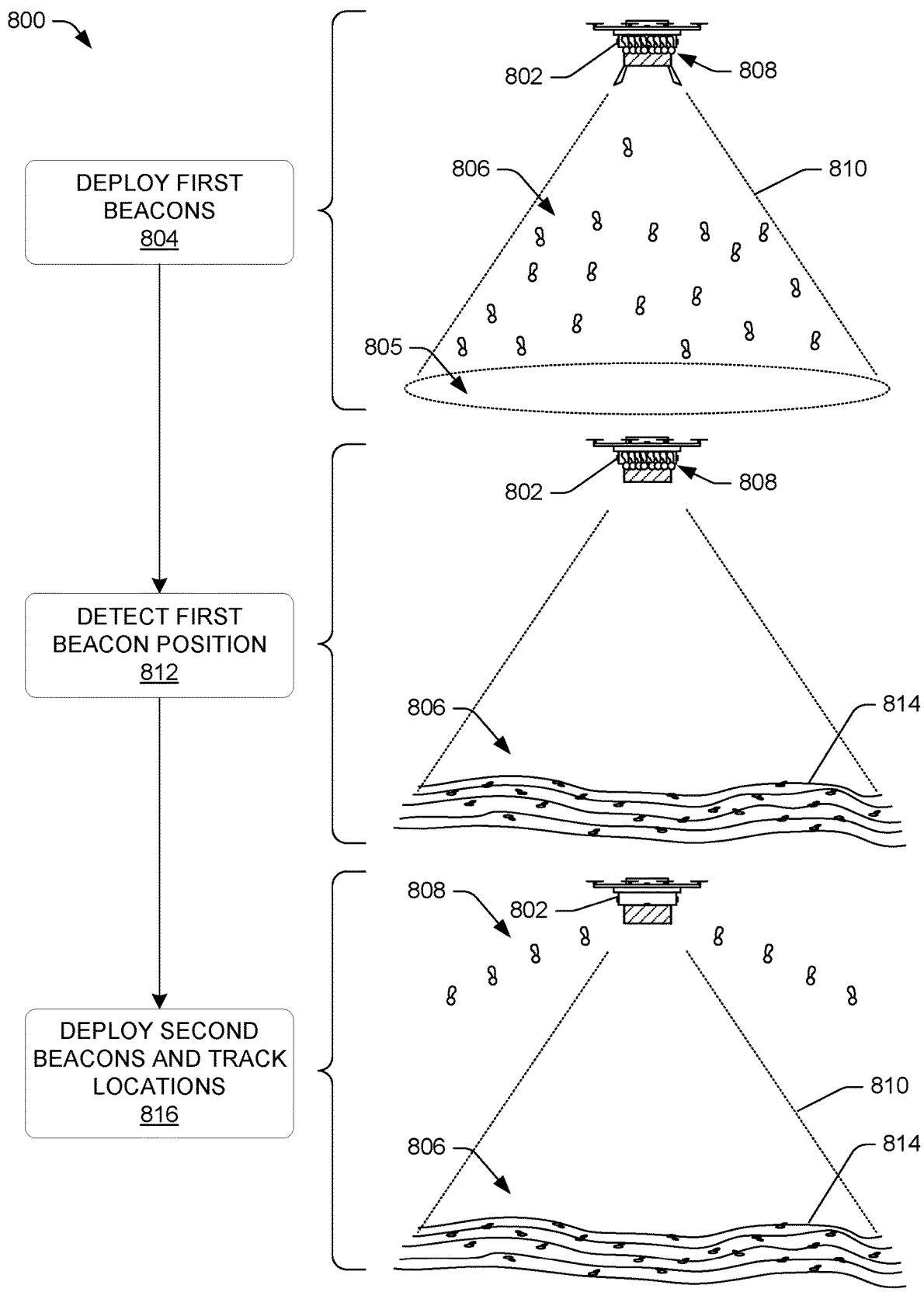
FIG. 8 is a pictorial flow diagram of an illustrative process to deploy additional navigation beacons after an initial deployment of some navigation beacons.

FIG. 8 is a pictorial flow diagram of an illustrative process 800 to deploy additional navigation beacons after an initial deployment of some navigation beacons from a UAV 802.

At 804, the UAV 802 may detect a fault that prevents the UAV from accurately resolving a location or orientation of the UAV 802, such as with reference to a surface 805 (e.g., the ground, a structure, etc.). The fault may be a malfunction of a sensor or communication mechanism associated with the sensor. The fault may be based on environmental conditions, which prevent the sensor from providing useful data for the UAV 802 to resolve a position and/or orientation. For example, if the UAV relies on images from a stereo camera to resolve a position of the ground relative to the UAV, then heavy fog, heavy rain, or possibly complete darkness may prevent the UAV from detecting the ground based on a type of sensor used and/or other factors. In this example, the sensor (e.g., the stereo camera) may be working properly, but the received data may not be useful for the UAV 802 to resolve a position and/or orientation. At 804, the UAV 802 may deploy first navigation beacons 806 from the UAV 802, such as from a repository of the UAV 802. The repository may be a cargo hold (bay), locations external to a fuselage or body of the UAV, locations proximate to rotors or propulsion units of the UAV 802, and/or other locations that can couple the first navigation beacons 806 to the UAV to enable selective deployment of the first navigation beacons 806, which may be a portion of all navigation beacons. As an example, the first navigation beacons 806 may be stored in a cargo hold and deployed from the cargo hold when one or more doors of the cargo hold are opened to allow the first navigation beacons 806 to exit the cargo hold, and thus become uncoupled from the UAV 802. The first navigation beacons 806 may be a portion of the navigation beacons transported by the UAV 802, which may also include a second navigation beacons 808, which may not be deployed at this time.

The UAV 802 may deploy the first navigation beacons 806 in response to a trigger event. In some embodiments, the trigger event may be a loss of reliable orientation and/or position data, possibly in combination with other data. For example, loss of orientation and/or position data, at least momentarily, may not warrant deployment of the navigation beacons unless the UAV's last known location is within a threshold distance from the surface 805. When the UAV 802 is above the threshold distance, the UAV may delay deployment of the navigation beacons in an attempt to obtain reliable orientation and/or position data, at least for a threshold amount of time before deploying the first navigation beacons 806. Other trigger events and/or conditions may be implemented to cause the UAV 802 to deploy the first navigation beacons 806 in appropriate situations, and refrain from deploying the navigation beacons prematurely, and thus "wasting" use of the navigation beacons or deploying the navigation beacons in inopportune circumstances (e.g., at an altitude that is too high, when orientation and/or positional data is only lost for a brief moment, etc.).

The UAV 802 and/or the first navigation beacons 806 may include features to cause the navigation beacons to disperse from the UAV about a dispersion envelope 810, which may be defined by an angle toward the ground. The angle may not exceed 180 degrees for practical purposes since the navigation beacons may not include devices to cause upward lift (e.g., flight), and thus will drop toward the ground. The angle may be between 45 degrees and 90 degrees in some embodiments. The angle and size the dispersion envelope 810 may determine an area of coverage of the first navigation beacons 806 when they land on the ground and/or land on other surfaces. To cause the navigation beacons to disperse about the dispersion envelope 810, the UAV 802 may eject the navigation beacons with at least some lateral force (e.g., biasing device, pneumatic force, combustion force, etc.) In some embodiments, the navigation beacons may include wings and/or other features that cause the beacons to travel laterally during a downward descent. For example, the first navigation beacons 806 may include a wing shaped similar to conifer seeds, which cause the navigation beacons to travel laterally during at least part of a descent.

At 812, the UAV 802 may detect locations of the navigation beacons. The UAV 802 may delay a detection for a predetermined amount of time, such as an anticipated amount of time to allow the navigation beacons to land proximate the surface 805 or in response to a different trigger event (e.g., termination of a sound from a sound generating device, activation of a sensor (e.g., the sensor 608 shown in FIG. 6A), etc. Other devices, described below, may be used to create the different trigger event.

The UAV 802 may determine locations of the first navigation beacons 806 based on signals output by the navigation beacons, such as auditory signals, visual signals, and/or radio signals. The UAV 802 may determine locations of the first navigation beacons 806 by detecting locations of the navigation beacons by sensors, such as an array of microphones or radio receivers, or by an imaging device. The UAV 802 may include a component to perform position and orientation tracking using Simultaneous Localization and Mapping (SLAM) algorithms adapted to the detected unique three-dimensional (3D) features, which may define a resolved surface 814, which may include contours defined by algorithms based on unique locations of the first navigation beacons 806.

At 816, after resolving location and/or orientation of the UAV, the UAV may deploy the second navigation beacons 808 from the UAV 802. The second navigation beacons 808 may be ejected from the UAV having a lateral force to enable the second beacons to travel laterally outside of the dispersion envelope 810 associated with deployment of the first navigation beacons 806. The UAV 802 may track location and flight of the second navigation beacons 808, to determine presence and/or locations of adjacent objects, structures, obstacles, buildings, and/or other features. For example, the UAV may determine a change in direction of one of the second beacons, and may determine based on this change in direction that a surface may be present at the location of the change in direction, which caused the navigation beacon to deflect and change direction. Other location information may be determined by the second navigation beacons 808. In some embodiments, the second navigation beacons 808 may be used for a same purpose as the first navigation beacons 806, but at a different location, and thus result in mapping a different area of the ground or another surface.

In accordance with one or more embodiments, the vehicle may perform control operations based on the resolved locations of the navigation beacons, which may be mapped as a surface relative to the vehicle. For example, UAV may land proximate to the navigation beacons after resolving locations of the navigation beacons as a continuous surface.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV) comprising:
   an airframe;
   a plurality of propulsion units coupled to the airframe to cause propulsion of the UAV;
   a deployment mechanism to uncouple a plurality of beacons from a storage repository, each beacon outputting at least one of a light signal, a sound signal, or a radio signal;
   a beacon detection component to receive from the plurality of beacons at least a first signal from a first beacon, a second signal from a second beacon, and a third signal from a third beacon;
   a localization and mapping component to detect locations of at least the first beacon, the second beacon, and the third beacon based at least in part on the first signal, the second signal, and the third signal; and
   a flight controller to output control signals for the plurality of propulsion units in response to the locations of the at least the first beacon, the second beacon, and the third beacon.

2. The UAV as recited in claim 1, wherein the storage repository is a cargo hold, and wherein the deployment mechanism includes a door coupled to the cargo hold, the door configured to selectively open to cause the plurality of beacons to fall out of the cargo hold.

3. The UAV as recited in claim 1, wherein the first signal includes a first light signal including a first pulse sequence of light and the second signal includes a second light signal including a second pulse sequence of light that is different than the first pulse sequence of light.

4. The UAV as recited in claim 1, wherein the first signal includes a first radio signal including a first predetermined radio frequency and the second signal includes a second radio signal including a second predetermined radio frequency that is different than the first predetermined radio frequency.

5. The UAV as recited in claim 1, wherein the flight controller is configured to land the UAV on a surface mapped by the locations of the first beacon, the second beacon, and the third beacon.

6. A method comprising:
   determining a trigger event;
   causing deployment of at least one beacon from a vehicle;
   receiving a signal from the at least one beacon;
   determining a location of the at least one beacon based on the signal; and
   generating a control for the vehicle in response to the location of the at least one beacon.

7. The method as recited in claim 6, wherein the receiving the signal further comprises receiving at least a first signal from a first beacon, a second signal from a second beacon, and a third signal from third beacon, wherein the first signal is different than the second signal and the third signal.

8. The method as recited in claim 6, wherein the determining the location of the at least one beacon includes triangulating the location of the at least one beacon based on receipt of at least one of a radio signal from at least one the beacon or a sound emitted by the at least one beacon.

9. The method as recited in claim 6, wherein the determining the location of the at least one beacon includes determining the location of the at least one beacon based on processing a stereo image that depicts the at least one beacon.

10. The method as recited in claim 6, wherein the determining the trigger event includes determining a fault associated with a location device of the vehicle and determining that a last known location of the vehicle is within a threshold distance from a ground.

11. The method as recited in claim 6, wherein the causing the deployment of the at least one beacon from the vehicle includes causing deployment of a first portion of the at least one beacon, and further comprising causing deployment of a second portion of the at least one beacon in response to a different triggering event.

12. The method as recited in claim 6, further comprising determining that a threshold number of beacons of the at least one beacon are stationary after deployment based on at least one of termination of first signals or receipt of second signals from the threshold number of beacons.

13. The method as recited in claim 6, wherein the generating the control includes causing propulsion units to move the vehicle away from the location indicated by the at least one beacon.

14. The method as recited in claim 6, wherein the causing the deployment of the at least one beacon from the vehicle includes decoupling a beacon coupled to an exterior housing of the vehicle, the beacon storing potential energy when coupled to the vehicle.

15. A system comprising:
a plurality of beacons configured for deployment, each beacon of the plurality of beacons outputting at least one of a light, a sound, or a radio signal;
a deployment mechanism to uncouple the plurality of beacons from a storage repository;
a beacon detection component to receive signals from the plurality of beacons; and
a localization and mapping component to detect locations of at least some of the plurality of beacons.

16. The system as recited in claim 15, wherein the plurality of beacons include a first portion of beacons and a second portion of beacons, the first portion of beacons configured with aerodynamic features to cause the first portion of beacons to land prior to the second portion of beacons, the second portion of beacons including dispersion features to cause the second portion of beacons to travel at least partially laterally with respect to a location of deployment of the plurality of beacons.

17. The system as recited in claim 15, wherein the beacon detection component includes an array of microphones to receive sound generated by at least some of the plurality of beacons.

18. The system as recited in claim 15, wherein the beacon detection component includes a plurality of radio receivers to receive radio signals generated by at least some of the plurality of beacons.

19. The system as recited in claim 15, wherein the beacon detection component includes a plurality of image sensors to detect light generated by at least some of the plurality of beacons.

20. The system as recited in claim 15, wherein at least some of the plurality of beacons include a capacitor to store energy to output the at least one of the light, the sound, or the radio signal.

* * * * *